(12) United States Patent  
Advey

(10) Patent No.: US 9,028,163 B2  
(45) Date of Patent: May 12, 2015

(54) LEVER-ACTION CONNECTOR ASSEMBLY

(76) Inventor: Alexander J. Advey, Ypsilanti, MI (US)

(*) Notice: Subject to any disclaimer, the term of this patent is extended or adjusted under 35 U.S.C. 154(b) by 84 days.

(21) Appl. No.: 13/443,982

(22) Filed: Apr. 11, 2012

(65) Prior Publication Data

US 2013/0108357 A1  May 2, 2013

Related U.S. Application Data

(60) Provisional application No. 61/551,574, filed on Oct. 26, 2011.

(51) Int. Cl.
*H01R 13/629* (2006.01)
*B60L 11/18* (2006.01)
*F16B 7/04* (2006.01)

(52) U.S. Cl.
CPC ....... *H01R 13/62933* (2013.01); *Y10T 403/595* (2013.01); *B60L 11/1818* (2013.01); *F16B 7/0426* (2013.01); *Y02T 10/7088* (2013.01); *Y02T 10/7005* (2013.01); *Y02T 90/121* (2013.01); *Y02T 90/14* (2013.01)

(58) Field of Classification Search
CPC .................. H01R 13/62938; H01R 13/62933; H01R 13/62966; H01R 13/62972; H01R 13/62977; H01R 13/62; H01R 13/62955; H01R 13/62905; H01R 13/62911; H01R 13/6295; H01R 13/64; F16L 37/18
USPC ............ 403/321, 322.1, 322.4, 374.5, 374.2; 285/124.2, 124.3, 124.4, 308, 312; 74/141.5, 469, 471 R, 519–529; 439/259, 266; 292/57, 58
See application file for complete search history.

(56) References Cited

U.S. PATENT DOCUMENTS

| 297,880 | A | * | 4/1884 | Riper et al. | 285/311 |
|---|---|---|---|---|---|
| 476,711 | A | * | 6/1892 | Whelan | 285/311 |
| 762,777 | A | * | 6/1904 | Vernon | 285/311 |
| 935,587 | A | * | 9/1909 | Casey | 285/311 |
| 969,019 | A | * | 8/1910 | Wilson et al. | 285/311 |
| 1,361,856 | A | * | 12/1920 | Heininger | 285/311 |
| 1,793,015 | A | * | 2/1931 | Roos | 285/311 |
| 2,352,481 | A | | 6/1944 | Hyland | |
| 2,487,801 | A | | 11/1949 | Healy, Jr. | |
| 3,157,450 | A | | 11/1964 | Harrison, Sr. et al. | |
| 3,278,205 | A | * | 10/1966 | Barlow | 285/311 |
| 3,603,910 | A | * | 9/1971 | Schumacher | 439/160 |
| 3,711,816 | A | * | 1/1973 | Schumacher | 439/352 |
| 3,721,359 | A | * | 3/1973 | Howell et al. | 414/505 |
| 3,830,525 | A | | 8/1974 | Ransford | |
| 4,083,619 | A | * | 4/1978 | McCormick et al. | 439/310 |
| 4,623,172 | A | | 11/1986 | Shepheard | |

(Continued)

*Primary Examiner* — Michael P Ferguson
*Assistant Examiner* — Matthieu Setliff
(74) *Attorney, Agent, or Firm* — Harness, Dickey & Pierce, P.L.C.

(57) ABSTRACT

A connector assembly that includes a first connector, a lever, a second connector and a link. The lever is pivotally mounted to the first connector for movement about a pivot axis between a first lever position and a second lever position. The second connector has a lug. The link is pivotally coupled to the lever at a location that is spaced apart from the pivot axis. The link has a coupling member with a slotted interior aperture and an engagement tab. The lug is received into the slotted interior aperture when the lever is in the first lever position. The engagement tab engages the lug to inhibit relative movement of the second connector away from the coupling member when the lever is moved from the first lever position to the second lever position.

22 Claims, 6 Drawing Sheets

(56) References Cited

U.S. PATENT DOCUMENTS

| | | | |
|---|---|---|---|
| 4,682,847 A | 7/1987 | Moore et al. | |
| 4,840,574 A * | 6/1989 | Mills | 439/191 |
| 5,564,935 A | 10/1996 | Yagi et al. | |
| 5,575,675 A * | 11/1996 | Endo et al. | 439/310 |
| 5,873,745 A | 2/1999 | Duclos et al. | |
| 6,019,620 A | 2/2000 | Kodama et al. | |
| 6,142,800 A * | 11/2000 | Iwahori | 439/157 |
| 6,171,120 B1 * | 1/2001 | Bolich et al. | 439/157 |
| 6,217,354 B1 * | 4/2001 | Fencl et al. | 439/157 |
| 6,305,957 B1 * | 10/2001 | Fink et al. | 439/157 |
| 6,345,995 B1 * | 2/2002 | Bigotto et al. | 439/157 |
| 6,375,481 B2 | 4/2002 | Zweigle | |
| 6,612,854 B2 * | 9/2003 | Takata | 439/157 |
| 6,652,298 B2 * | 11/2003 | Ohnuki | 439/157 |
| 6,783,380 B1 * | 8/2004 | Kamath et al. | 439/247 |
| 6,824,405 B2 * | 11/2004 | Hubbard et al. | 439/136 |
| 6,971,894 B2 | 12/2005 | Dillon et al. | |
| 7,083,462 B1 * | 8/2006 | Chen et al. | 439/372 |
| 7,789,682 B1 | 9/2010 | Hitchcock et al. | |
| 2012/0299291 A1 * | 11/2012 | Kamiya et al. | 285/308 |

* cited by examiner

LEVER-ACTION CONNECTOR ASSEMBLY

CROSS-REFERENCE TO RELATED APPLICATIONS

This application claims the benefit of U.S. Provisional Application No. 61/551,574, filed on Oct. 26, 2011. The entire disclosure of the above application is incorporated herein by reference.

FIELD

The present disclosure relates to a lever-action connector assembly.

BACKGROUND

This section provides background information related to the present disclosure which is not necessarily prior art.

A lever-action connector assembly typically includes a lever having a cam feature such as a curved slot. The lever is pivotally mounted to a first connector, and the cam feature receives a projection on a second connector as the first and second connectors are pushed together. The lever is then rotated to engage the projection on the second connector with the cam feature on the lever and thereby bring the first and second connectors closer together.

The cam feature requires a certain amount of space to achieve its function. Thus, the cam feature increases the size of the lever and the overall size of the connector assembly. In turn, the cost of the connector assembly is increased, and the connector assembly may not satisfy packaging requirements.

SUMMARY

This section provides a general summary of the disclosure, and is not a comprehensive disclosure of its full scope or all of its features.

A first connector assembly according to the principles of the present disclosure includes a first connector, a lever, a second connector and a link. The lever is pivotally mounted to the first connector for movement about a pivot axis between a first lever position and a second lever position. The second connector has a lug. The link is pivotally coupled to the lever at a location that is spaced apart from the pivot axis. The link has a coupling member with a slotted interior aperture and an engagement tab. The lug is received into the slotted interior aperture when the lever is in the first lever position. The engagement tab engages the lug to inhibit relative movement of the second connector away from the coupling member when the lever is moved from the first lever position to the second lever position.

A second connector assembly according to the principles of the present disclosure includes a first connector, a lever, a second connector, and a pair of links. The lever is coupled to the first connector for rotation between a first lever position and a second lever position. The second connector is configured to engage the first connector. The pair of links are distally coupled to the lever. The links provide a mechanical advantage when the lever is rotated from the first lever position to the second lever position to seat the first connector in the second connector.

A third connector assembly according to the principles of the present disclosure includes a first connector, a second connector, and a coupling mechanism. The coupling mechanism is configured to couple the first connector and the second connector. The coupling mechanism includes a lever and a slider crank mechanism. The slider crank mechanism includes a crank, which is coupled to the lever for rotation therewith, and a connecting rod that is releasably coupled to the second connector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms "first", "second", "third", etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
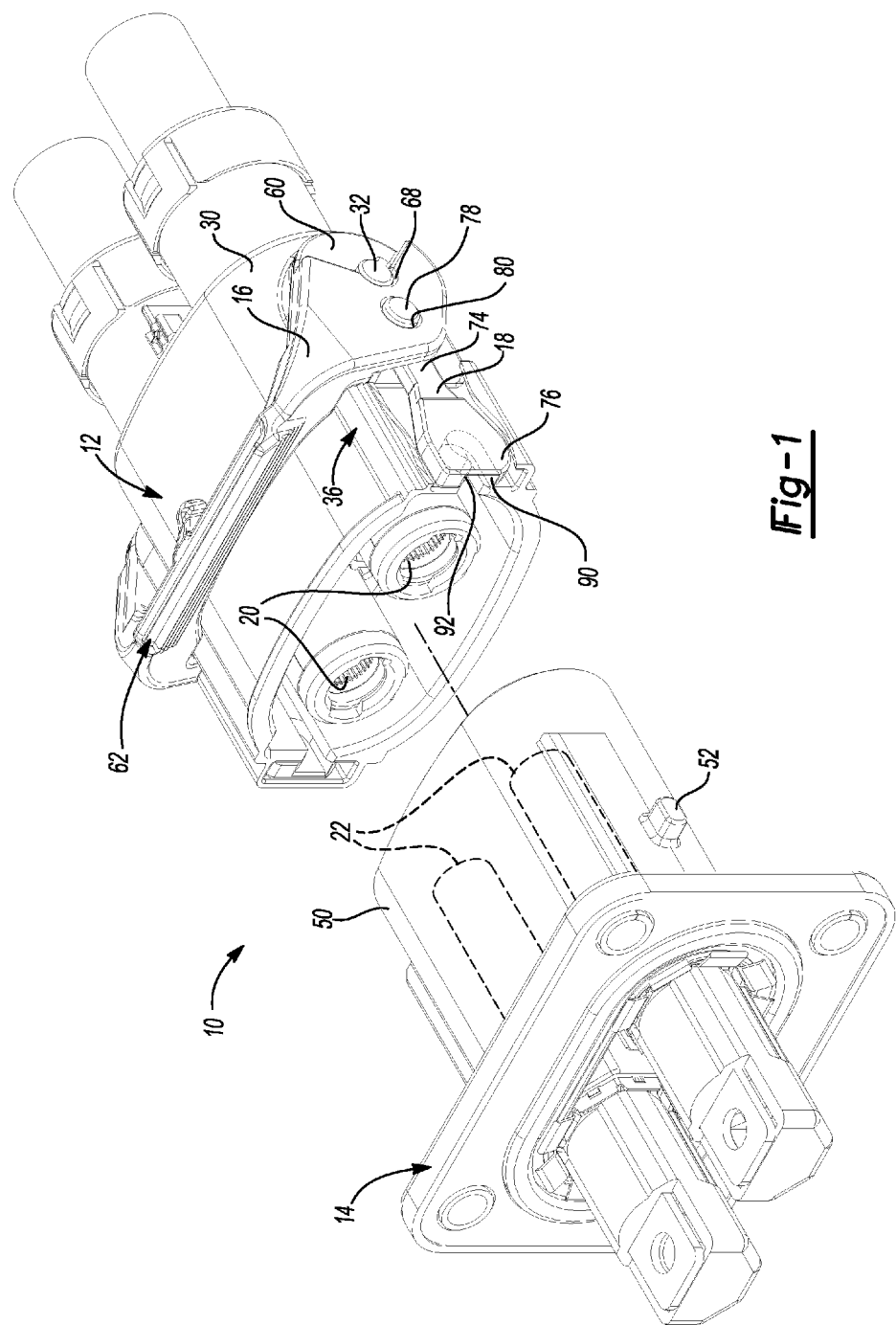
FIG. 1 is a perspective view of a lever-action connector assembly constructed in accordance with the teachings of the present disclosure, the lever-action connector assembly including a first connector and a second connector.
Figure 2:
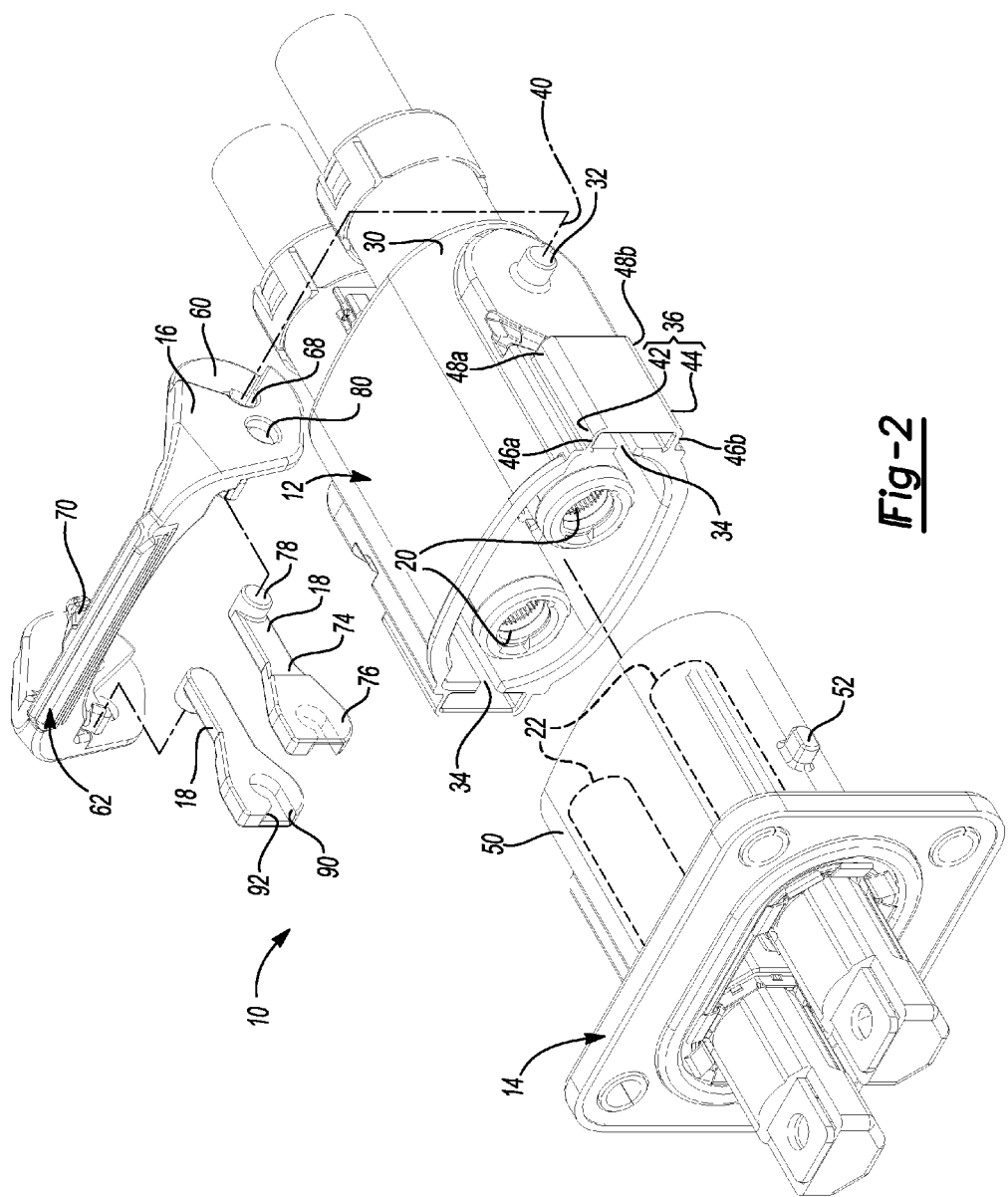
FIG. 2 is a perspective view of the lever-action connector assembly of FIG. 1 with a pair of links and a lever arm exploded from the first connector.

With reference to FIGS. 1 and 2 of the drawings, an exemplary lever-action connector assembly constructed in accordance with the teachings of the present disclosure is generally indicated by reference numeral 10. The connector assembly can comprise a first connector 12, a second connector 14, a lever 16 and a pair of links 18. The first and second connectors 12 and 14 have mating terminals 20 and 22, respectively, which are configured to matingly and electrically engage one another to transmit electricity.

The first connector 12 can comprise a first connector body 30, a pair of first lugs 32 (only one shown), a pair of engagement slots 34 (only one shown), and a plurality of link guides 36 (only one shown). Each of the first lugs 32 can extend outwardly from the first connector body 30 on opposite sides of the first connector body 30 and can define a pivot axis 40. The engagement slots 34 can be formed longitudinally through a portion of the first connector body 30 and can be disposed such that the longitudinal axis of the engagement slots 34 are generally perpendicular to the pivot axis 40. Each link guide 36 can include an upper guide member 42 and a lower guide member 44. Each of the upper guide members 42 can have a first guide portion 46a and a second guide portion 48a, while each of the lower guide members 44 can have a first guide portion 46b and a second guide portion 48b.

The second connector 14 can comprise a second connector body 50 and a pair of second lugs 52 (only one shown). Each of the second lugs 52 can extend outwardly from the second connector body 50 on opposite sides of the second connector body 50. In the particular example provided, the second connector body 50 is configured to be received into the first connector body 30 such that each of the second lugs 52 extends outwardly through a corresponding one of the engagement slots 34.

The lever 16 can comprise a pair of yokes 60 (only one shown) and a lever member 62 that can be mounted between the yokes 60. Each of the yokes 60 can be pivotally coupled to the first connector body 30 and can be pivotally coupled to an associated one of the links 18. In the particular example provided, each yoke 60 defines a first pivot aperture 68 that is configured to receive a corresponding one of the first lugs 32 so that the yokes 60 can pivot about the pivot axis 40 between a first lever position (shown in FIGS. 1 and 3) and a second lever position (shown in FIG. 5). In the second lever position, the lever 16 is rotated in a counterclockwise direction about the first lugs 32 such that the first connector body 30 is received into a body slot 70 formed in the lever member 62.

Each of the links 18 can have a link body 74, which can be pivotally mounted to an associated one of the yokes 60 at a first end, and a coupling member 76 that can be coupled to a distal end of the link body 74. In the example provided, each of the links 18 has a link lug 78 that is received into a link lug aperture 80 formed in the associated one of the yokes 60. The link lug apertures 80 can be positioned on the yokes 60 relative to the lever member 62 to gain a desired mechanical advantage. In the particular example provided, each of the link lug apertures 80 is spaced apart but disposed in-line with an associated one of the first lugs 32 and is disposed in-line with an associated one of the engagement slots 34 when the lever 16 is disposed in the first lever position. The coupling member 76 is configured to releasably engage an associated one of the second lugs 52. In the example illustrated, each coupling member 76 is generally C-shaped having a slotted interior aperture 90 and an engagement tab 92.

Figure 3:
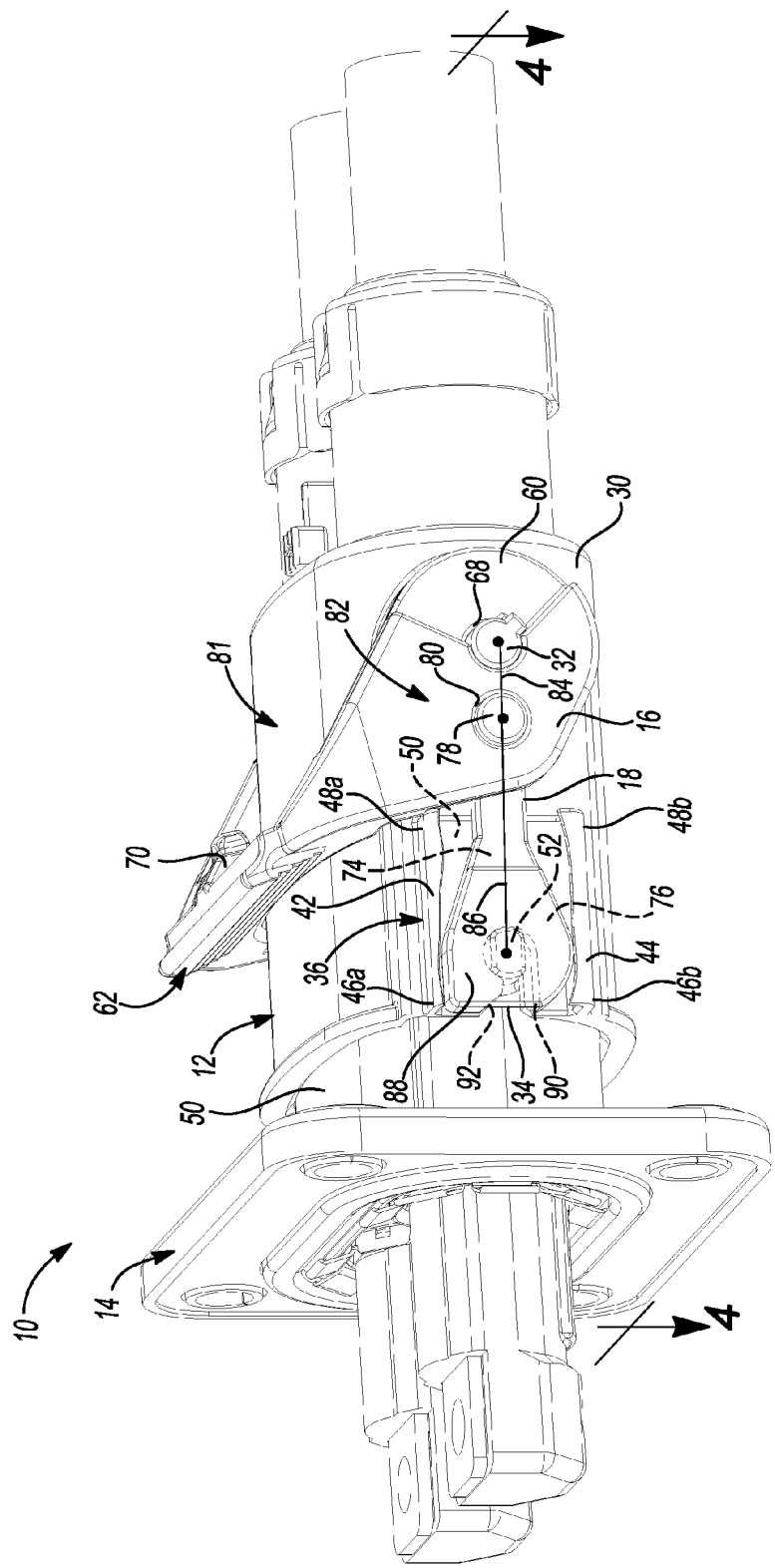
FIG. 3 is a perspective view of the lever-action connector assembly of FIG. 1 with the first and second connectors in a pre-set position.
Figure 4:
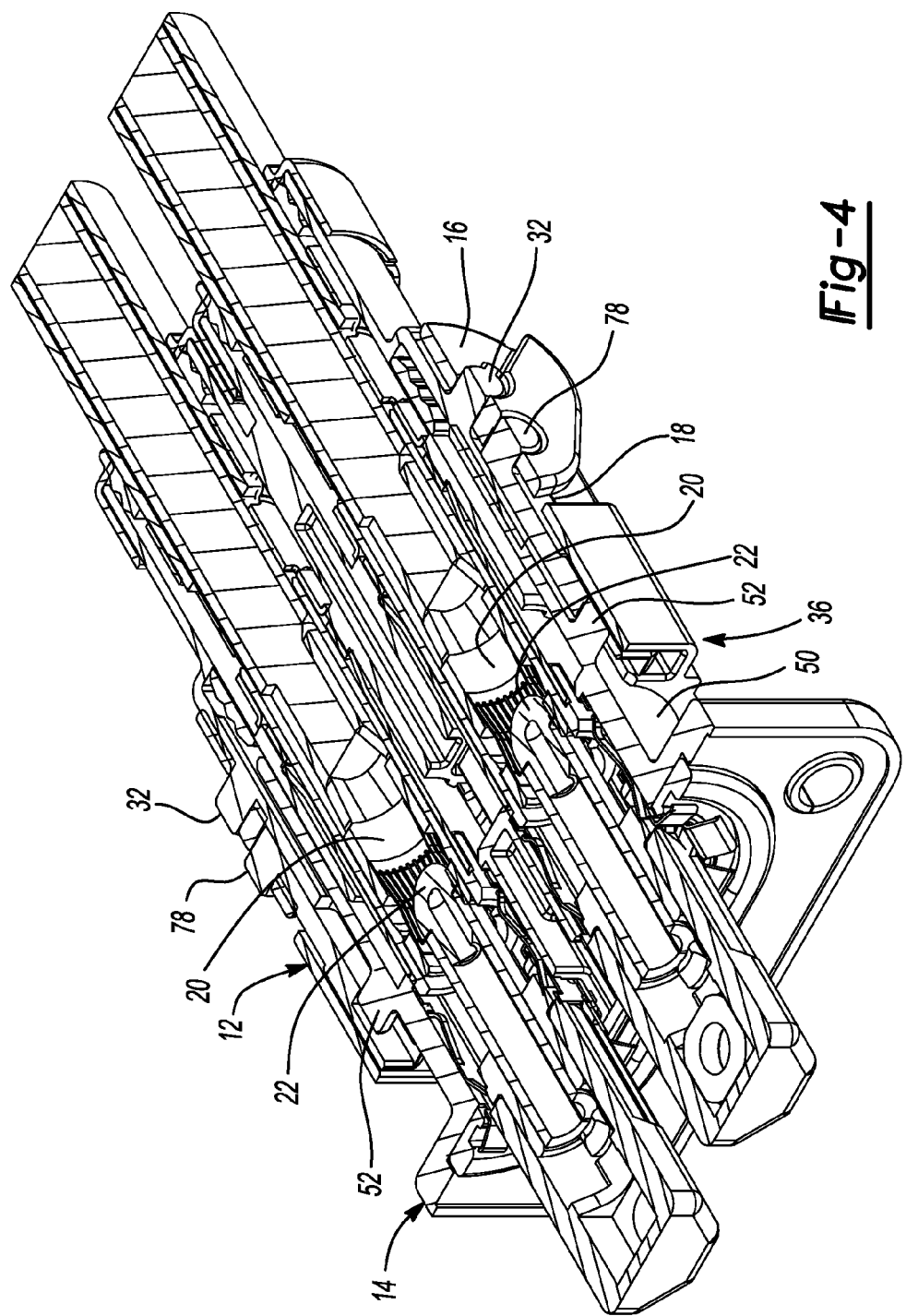
FIG. 4 is a section view of the lever-action connector assembly of FIG. 1 taken along line 4-4 shown in FIG. 3.

With reference to FIGS. 3 and 4, when assembling the lever-action connector assembly 10, the first and second connectors 12 and 14 are mated to one another and pushed together into a pre-set position that is shown in FIG. 3. In this regard, the first and second connector bodies 30 and 50 are engaged to one another such that the second lugs 52 are received in the engagement slots 34. In addition, the first and second connectors 12 and 14 are pushed together such that the second lugs 52 are received into the coupling members 76. The first guide portions 46a and 46b can be configured to orient the coupling members 76 such that the second lugs 52 can be slid into the slotted interior apertures 90. Additionally or alternatively, the first guide portions 46a and 46b can be spaced apart by a distance that permits the coupling members 76 to rotate about the link lug apertures 80 and/or deflect in a direction that is perpendicular to the longitudinal axis of the engagement slots 34 in response to contact between the engagement tabs 92 and the second lugs 52. In the pre-set position, the second lugs 52 are fully received into the slotted interior apertures 90 in the coupling members 76 and the engagement tabs 92 can be positioned in-line with the second lugs 52 to resist withdrawal of the second connector 14 from the first connector 12. As shown in FIG. 4, when the first and second connectors 12 and 14 are in the pre-set position, the terminals 20 and 22 of the first and second connectors 12 and 14 may be engaged to some extent, albeit an extent that is less than full engagement.

Figure 5:
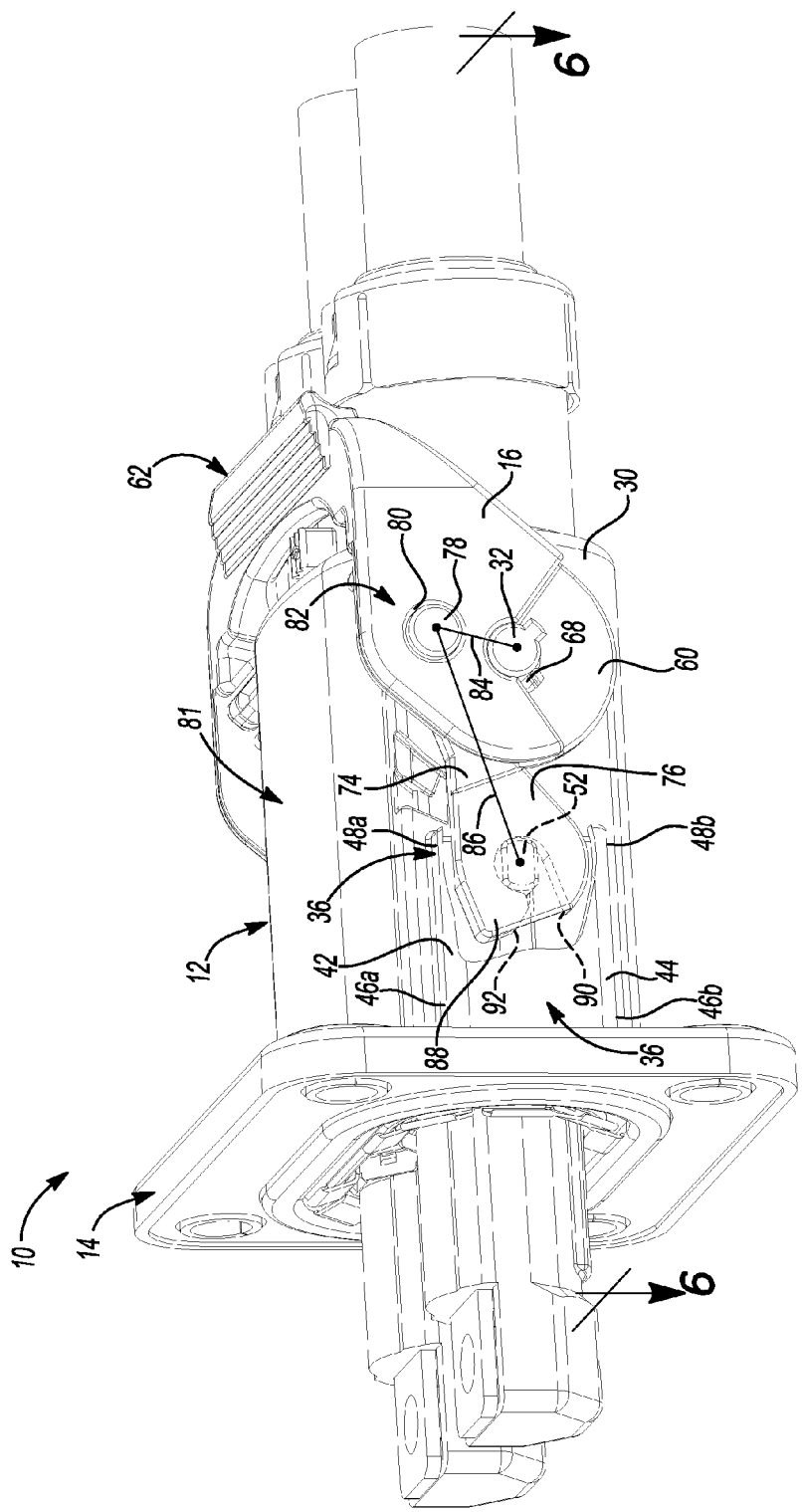
FIG. 5 is a perspective view of the lever-action connector assembly of FIG. 1 with the first and second connectors in a full-set position.
Figure 6:
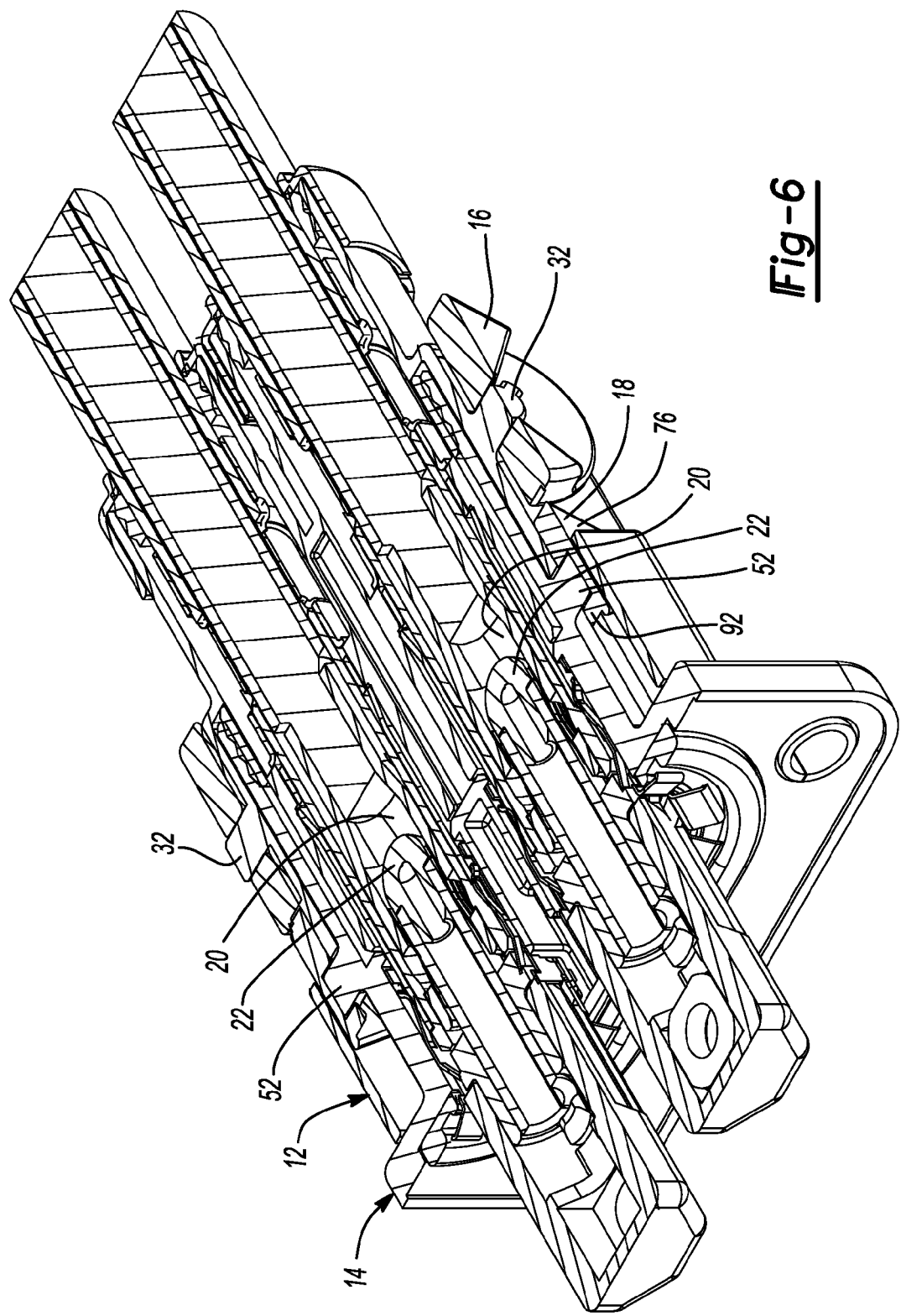
FIG. 6 is a section view of the lever-action connector assembly of FIG. 1 taken along line 6-6 shown in FIG. 5.

With reference to FIGS. 5 and 6, the lever 16 can be rotated from the first lever position to the second lever position to place the first and second connectors 12 and 14 in a full-set position that is shown in FIG. 5. As shown in FIG. 6, when the first and second connectors 12 and 14 are in the full-set position, the terminals 20 and 22 are fully electrically and mechanically engaged to one another. Rotation of the lever 16 can cause corresponding rotation of the link lugs 78 about the first lugs 32. Since the link lugs 78 are spaced apart from the first plugs 32, rotation of the lever 16 will create movement of the link lugs 78 in an axial direction away from the interface between the first and second connectors 12 and 14, as well as movement of the link lugs 78 in a direction that is perpendicular to the engagement slots 34. The movement of the link lugs 78 in this manner can cause both rotation of the coupling members 76 about the second lugs 52 (such that the slotted interior apertures 90 of the coupling members 76 are disposed transverse to the engagement slots 34 to thereby inhibit withdrawal of the second lugs 52 from the coupling members 76) as well as translation of the coupling members 76 in axial directions toward the first lugs 32. It will be appreciated that because the coupling members 76 are effectively rotatably coupled to the second lugs 52 and because the second lugs 52 are confined by the engagement slots 34, the movement of the coupling members 76 in this manner applies counter-directed forces to the first and second lugs 32 and 52 that pulls the second connector 14 into the first connector 12 such that the first and second connectors 12 and 14 are positioned in the full-set position when the lever 16 is in the second lever position.

As discussed above, rotation of the lever 16 between the first lever position (shown in FIG. 3) and the second lever position (shown in FIG. 5) can cause translation of the coupling members 76. In this regard, the first and second connectors 12 and 14 can be coupled together using a coupling mechanism 81 (shown in FIGS. 3 and 5) that includes the lever 16 and a slider crank mechanism 82. The slider crank mechanism 82 includes a pair of cranks 84, a pair of connecting rods 86, and a pair of sliders 88. The cranks 84, which include portions of the yokes 60 extending between the first lugs 32 and the link lugs 78, are rotatable about the first lugs 32. The connecting rods 86, which include the link bodies 74, each have one end that rotates with a corresponding one of the cranks 84 and an opposite end that translates with a corresponding one of the sliders 88. The sliders 88, which include the coupling members 76, translate inside the guides 36 in response to rotation of the cranks 84.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connector assembly comprising:
a first connector having a first connector housing;
a lever pivotally mounted to the first connector for movement about a pivot axis between a first lever position and a second lever position;
a second connector having a second connector housing and a first lug extending from the second connector housing;
a link that is pivotally coupled to the lever at a location that is spaced apart from the pivot axis, the link having a coupling member with a slotted interior aperture and an engagement tab; and
a link guide attached to the first connector housing and configured to orient the coupling member such that the slotted interior aperture receives the first lug when the lever is in the first lever position and the first and second connectors are pushed together, the engagement tab engaging the first lug to inhibit relative movement of the second connector away from the coupling member when the lever is moved from the first lever position to the second lever position, wherein the lever is rotatable about the pivot axis in a first direction to rotate the coupling member about a perimeter surface of the first lug in a second direction that is opposite from the first direction and to axially translate the coupling member.

2. The connector assembly of claim 1, wherein the first connector housing defines an engagement slot that receives the first lug when the first connector and the second connector are engaged with one another.

3. The connector assembly of claim 2, wherein the lever comprises a pair of yokes disposed on opposite sides of the first connector housing and a lever member extending between the yokes.

4. The connector assembly of claim 3, wherein a body slot is formed in the lever member and the first connector housing is received into the body slot when the lever is in the second lever position.

5. The connector assembly of claim 2, wherein the link includes a link lug that is received into a link lug aperture formed in the lever.

6. The connector assembly of claim 5, wherein the first connector has a second lug that is received into a pivot aperture formed in the lever.

7. The connector assembly of claim 6, wherein the link lug aperture is disposed in-line with the second lug and the engagement slot when the lever is in the first lever position.

8. The connector assembly of claim 7, wherein rotating the lever causes rotation of the coupling member about the first lug and translation of the coupling member in a direction toward the second lug.

9. The connector assembly of claim 6, wherein the link guide extends outward from the first connector housing, encloses the coupling member, and is configured to orient the coupling member such that the first lug is received into the slotted interior aperture as the first connector and the second connector are moved together.

10. The connector assembly of claim 9, wherein the link guide includes a first pair of guide portions that are spaced apart by a first distance that permits the coupling member to rotate about the second lug in response to contact between the engagement tab and the first lug.

11. The connector assembly of claim 10, wherein the link guide includes a second pair of guide portions that are spaced apart by a second distance that constrains movement of the coupling member to an axial direction.

12. The connector assembly of claim 1, wherein rotating the lever about the pivot axis causes the coupling member to rotate relative to the first connector housing.

13. A connector assembly comprising:
a first connector having a first connector housing with an open end;
a lever coupled to the first connector at a first location for rotation between a first lever position and a second lever position, the lever including a lever member for a user to engage to rotate the lever;
a second connector configured to engage the first connector, the second connector having a second connector housing and a first lug extending from the second connector housing; and
a pair of links distally coupled to the lever at a second location, the links providing a mechanical advantage when the lever is rotated from the first lever position to the second lever position to seat the first connector in the second connector, wherein a first distance between the second location and the lever member is less than a second distance between the first location and the lever member, wherein each of the links includes a link body and a coupling member fixed to the link body for rotation therewith, and wherein the coupling member defines a slotted interior aperture configured to receive the first lug, wherein rotating the lever from the first lever position to the second lever position causes the coupling member to translate axially and to rotate about a perimeter surface of the first lug.

14. The connector assembly of claim 13, wherein the first connector includes a pair of lugs, the lever includes a pair of yokes, and the lever member is mounted between the yokes, each of the yokes defining a pivot aperture that receives a corresponding one of the lugs on the first connector.

15. The connector assembly of claim 14, wherein each of the links includes a link lug that is received into a link lug aperture formed in the lever.

16. The connector assembly of claim 15, wherein the link lug apertures are positioned on the yokes relative to the lever member to gain the mechanical advantage.

17. The connector assembly of claim 13, wherein rotating the lever from the first lever position to the second lever position causes the coupling member to rotate relative to the first connector housing.

18. The connector assembly of claim 13, wherein the link body and the coupling member are portions of a single component.

19. A connector assembly comprising:
   a first connector including a first connector housing and a guide member extending outwardly from the first connector housing;
   a second connector including a second connector housing; and
   a coupling mechanism configured to couple the first connector and the second connector, the coupling mechanism including a lever and a slider crank mechanism, the lever being pivotally connected to the first connector housing for rotation relative to the first connector housing, the slider crank mechanism including a crank, which is coupled to the lever for rotation therewith, a connecting rod that is releasably coupled to the second connector, and a slider coupled to a distal end of the connecting rod, the slider releasably coupling the connecting rod to the second connector, wherein the guide member encloses and orients the slider, and the slider rotates and translates axially within the guide member.

20. The connector assembly of claim 19, wherein the lever is rotatably coupled to the first connector at a first location, the connecting rod is rotatably coupled to the lever at a second location, and the crank includes a portion of the lever extending between the first location and the second location.

21. The connector assembly of claim 19, wherein the guide member orients the slider and permits rotation of the slider.

22. The connector assembly of claim 21, wherein the guide member includes a first guide portion and a second guide portion disposed on opposite sides of the slider, wherein the first and second guide portions are spaced apart by a distance that permits rotation of the slider.

\* \* \* \* \*